Dec. 23, 1952     L. BERTELE     2,622,479

THREE-COMPONENT OBJECTIVE

Filed May 24, 1951

Inventor:
Ludwig Bertele

Patented Dec. 23, 1952

2,622,479

UNITED STATES PATENT OFFICE 2,622,479

THREE-COMPONENT OBJECTIVE

Ludwig Bertele, Heerbrugg, Switzerland

Application May 24, 1951, Serial No. 227,950
In Switzerland June 6, 1950

1 Claim. (Cl. 88—57)

The present invention relates to an improvement of a known type of objectives having a ratio of aperture of about 1:2.8, which type essentially consists of three members separated by air spaces. The first member, i. e. the member facing the object, as well as the third member are each a single collective lens, and the middle member is a meniscus with its convex free surface directed towards the object and being composed of three single lenses. The air space between the first and the middle member is of the shape of a thin negative lens the stronger curved surface of it being directed towards the image, and the air space between the middle and the third member having the shape of a thick lens with its stronger curved surface directed towards the object.

Investigations have shown that also with objectives of this type it is possible to increase the available image angle if according to the invention the axial thickness of the middle member is chosen smaller than 0.205 f and greater than 0.130 f, and if the sum of the reciprocal values of the radii of curvature of the lens surfaces directed towards the object of said first and said second member diminished with the reciprocal value of the radius of curvature of the lens surface directed towards the image of said first member is greater than 4.0/f and smaller than 6.0/f, f being the focal length of the objective. Without considerable increase in the zonal defects of the spherical aberration it is herewith possible to get the errors of coma invisible with image angles up to about ±15° with an aperture of the pencils, which allows one to keep the decrease of light towards the corners of the image within tolerable limits.

As the reflexions from the lens surfaces can be diminished by coating them with an antireflex layer the single lenses of the middle member need not to be cemented together so that thin air spaces exist within the member. The radii of curvature of the surfaces adjoining these air spaces may be somewhat different from each other.

Figure 1:
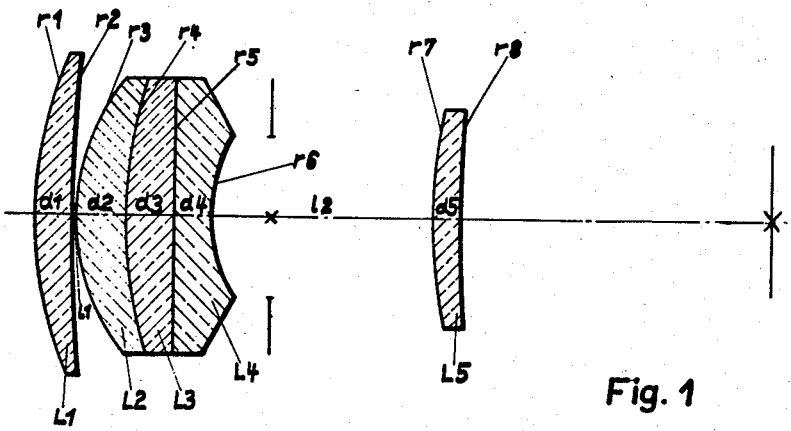
Fig. 1 illustrates diagrammatically an objective system arranged according to my invention.
Figure 2:
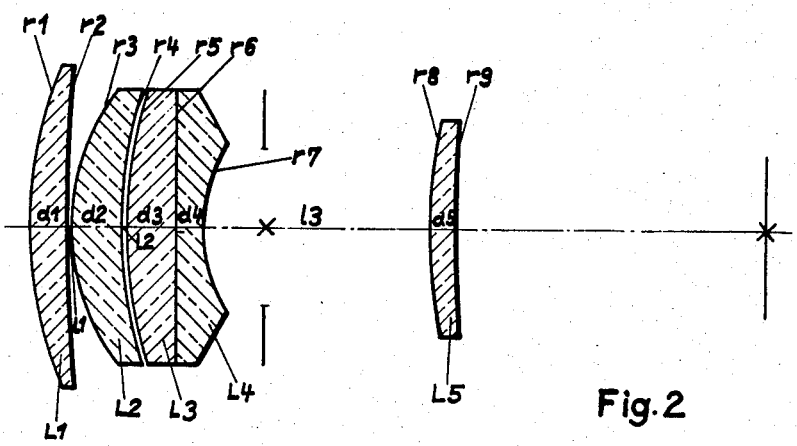
Fig. 2 illustrates diagrammatically another objective system.

In the drawing two examples of the invention are shown, having each a ratio of aperture of 1:2.8. In the drawing $B_1$ means the diaphragm. The data of these two examples are given by the following, calculated according to a focal length of the objective of 100 units.

Example 1

|  |  |  | $n_d$ | V |
|---|---|---|---|---|
| $L_1$ | $r_1=+\ 50.84$ | $d_1=\ 5.0$ | 1.6427 | 58.0 |
|  | $r_2=+215.0$ | $l_1=\ 0.35$ |  |  |
| $L_2$ | $r_3=+\ 30.23$ | $d_2=\ 6.6$ | 1.6427 | 58.0 |
|  | $r_4=+\ 60.96$ |  |  |  |
| $L_3$ |  | $d_3=\ 6.4$ | 1.5016 | 56.5 |
| $L_4$ | $r_5=\ \infty$ | $d_4=\ 4.6$ | 1.6726 | 32.3 |
|  | $r_6=+\ 20.38$ | $l_2=29.6$ |  |  |
|  | $r_7=+\ 71.63$ |  |  |  |
| $L_5$ | $r_8=+221.8$ | $d_5=\ 3.3$ | 1.6979 | 31.1 |

Example 2

|  |  |  | $n_d$ | V |
|---|---|---|---|---|
| $L_1$ | $r_1=+\ 56.28$ | $d_1=5.0$ | 1.6419 | 58.0 |
|  | $r_2=+261.26$ | $l_1=0.35$ |  |  |
| $L_2$ | $r_3=\ +29.56$ | $d_2=6.67$ | 1.6419 | 58.0 |
|  | $r_4=+\ 66.67$ | $l_2=0.56$ |  |  |
| $L_3$ | $r_5=+\ 64.44$ | $d_3=6.83$ | 1.4943 | 67.9 |
| $L_4$ | $r_6=\infty$ | $d_4=3.33$ | 1.6727 | 32.2 |
|  | $r_7=+\ 20.43$ | $l_3=30.0$ |  |  |
|  | $r_8=+\ 74.44$ |  |  |  |
| $L_5$ | $r_9=+278.26$ | $d_5=3.33$ | 1.6889 | 31.1 |

In both examples (r) are the radii of the refracting surfaces, (d) are the thicknesses of the lenses (L) and (l) are the air spaces between the lenses (L).

I claim:

Objective consisting of three members separated by air spaces, in which the first member and the third member are single collective lenses and the middle member is a meniscus with its stronger curved surface directed towards the object, which meniscus is composed of three lenses in such a manner that a positive lens and a negative one of high refractive indices are enclosing a collective lens of low refractive index, the air space between said first member and said middle member having the shape of a divergent lens bent towards the object, and the air space between said middle member and said third member having the shape of a collecting meniscus, the single collective lens constituting said third member consisting of a glass of strong color dispersion, the axial thickness of said middle member being smaller than 0.205 f and greater than 0.130 f, the sum of the reciprocal values of the radii of curvature of the lens surfaces directed towards the object of said first and said second member diminished with the reciprocal value of the radius of curvature of the lens surface directed towards the image of said first member being greater than 4.0/f and smaller than 6.0/f, f being the focal length of the objective.

LUDWIG BERTELE.

REFERENCES CITED

The following references are of record in the file of this patent:

UNITED STATES PATENTS

| Number | Name | Date |
|---|---|---|
| 1,998,704 | Bertele | Apr. 23, 1935 |
| 2,124,356 | Rayton | July 19, 1938 |
| 2,141,733 | Bertele | Dec. 27, 1938 |

FOREIGN PATENTS

| Number | Country | Date |
|---|---|---|
| 350,323 | Great Britain | June 11, 1931 |